United States Patent [19]

Beckstead et al.

[11] Patent Number: 5,628,261
[45] Date of Patent: May 13, 1997

[54] METHOD AND FURNACE FOR DECOMPOSING SOLID WASTE MATERIALS

[75] Inventors: Richard D. Beckstead; Ascencion G. Vera; Russell S. Curtis, all of Grantsville; George J. Brown, Jr., Tooele; Kirk L. Matthews, Grantsville, all of Utah; C. Steven Lekowski, Scottsdale, Ariz.

[73] Assignee: Chemical Lime Company, Fort Worth, Tex.

[21] Appl. No.: 406,558

[22] Filed: Mar. 20, 1995

[51] Int. Cl.⁶ .................................................. F23D 21/00
[52] U.S. Cl. ...................... 110/346; 110/348; 110/229; 110/245; 110/186; 110/188
[58] Field of Search .............................. 110/346, 348, 110/229, 244, 245, 255, 259, 287, 185, 188, 165 R, 186

[56] References Cited

U.S. PATENT DOCUMENTS

| | | |
|---|---|---|
| 2,072,450 | 3/1937 | Hobson, Jr. ............... 110/275 X |
| 4,110,121 | 8/1978 | Rechmeier et al. . |
| 4,249,472 | 2/1981 | Mitchell ..................... 110/245 |
| 4,387,654 | 6/1983 | Binasik et al. . |
| 4,551,051 | 11/1985 | Hofbauer et al. . |
| 4,565,138 | 1/1986 | Ueda et al. . |
| 4,572,082 | 2/1986 | Ueda et al. . |
| 4,860,669 | 8/1989 | Collins, Jr. et al. ........ 110/165 R |
| 4,864,944 | 9/1989 | Engstrom et al. ........... 110/245 X |
| 4,987,840 | 1/1991 | Honda ....................... 110/245 |
| 5,098,285 | 3/1992 | Bauer . |
| 5,226,375 | 7/1993 | Fukuda . |
| 5,244,490 | 9/1993 | Agarwal . |

FOREIGN PATENT DOCUMENTS 102024   6/1983   Japan ..................................... 110/188

Primary Examiner—Henry A. Bennett
Assistant Examiner—Susanne C. Tinker
Attorney, Agent, or Firm—Charles D. Gunter, Jr.; Grady K. Bergen

[57] ABSTRACT

A high temperature furnace and method for thermally decomposing solid combustible fuels into usable products to provide a source of heat to a selected area is disclosed. Solid combustible fuel, such as waste automobile tires, are introduced into a reaction vessel or combustion chamber which is defined by an outer wall. The reaction vessel has an upper portion and a lower portion with a central partition dividing the lower portion into compartments. Each compartment holds a fuel bed having a selected height wherein the sold fuel accumulates as it is being decomposed. Each compartment also has a bottom opening. Air ducts located along the outer wall of the reaction vessel and in the central partition supply pressurized air to the interior of the reaction vessel. An exhaust duct which communicates with the upper portion of the reaction vessel is supplied for venting off combustion or pyrolysis products from the reaction vessel to the selected area. A rotatably driven feeder extends across the bottom opening of each compartment so that the feeder acts as a bottom support for supporting the fuel bed of each compartment and for generally causing undecomposed material from the bottom of each fuel bed to be discharged out of the reaction vessel through the bottom opening as the feeder is rotated.

8 Claims, 4 Drawing Sheets

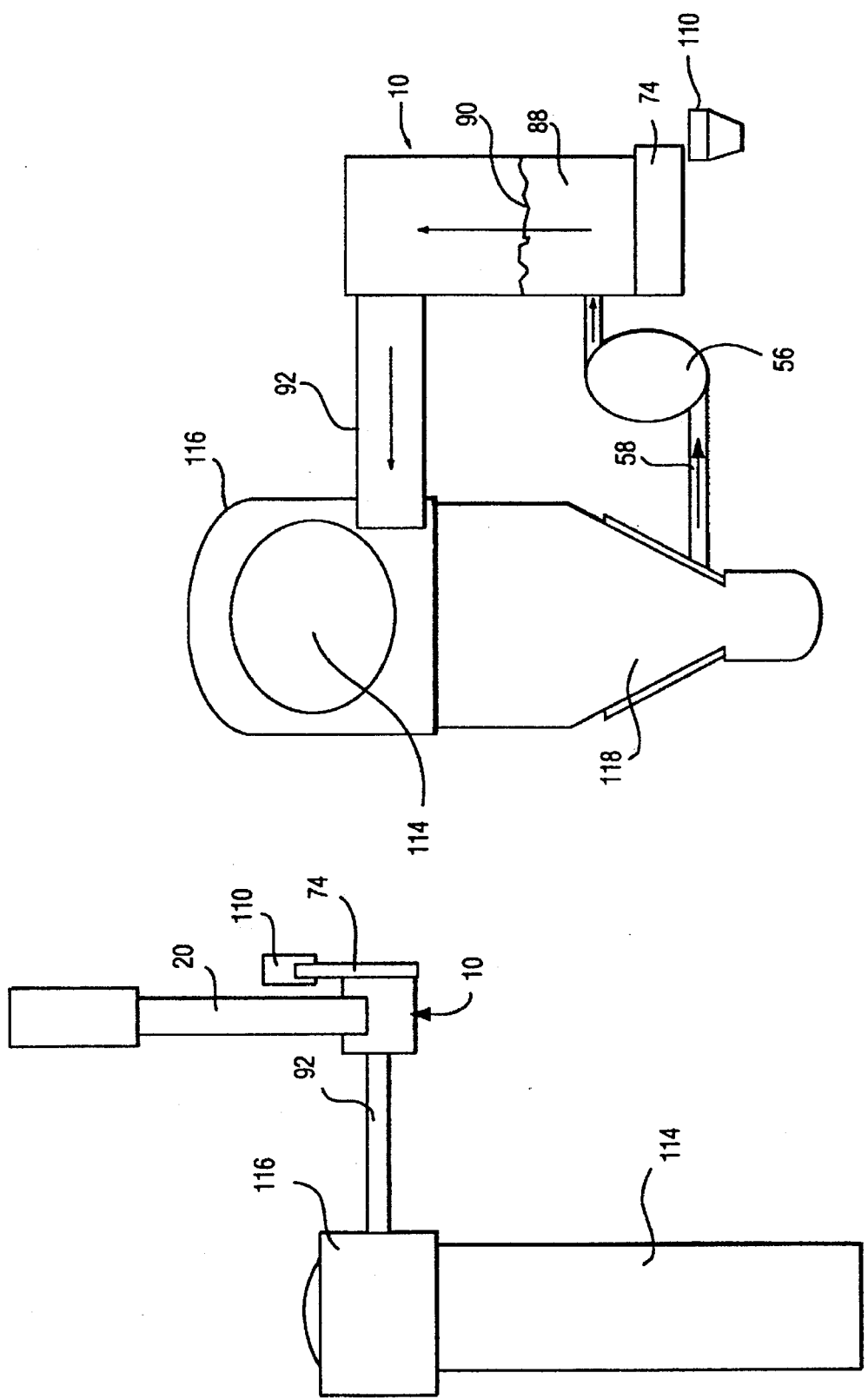

METHOD AND FURNACE FOR DECOMPOSING SOLID WASTE MATERIALS

BACKGROUND OF THE INVENTION

1. Field of the Invention

This invention relates to a furnace and method for decomposing solid waste materials, such as automobile tires, and using the exhaust as a source of heat which is supplied to a selected area.

2. Description of the Prior Art

Due to today's environmental concerns, the disposal of solid waste has been a particular problem. Much of this solid waste consists of synthetic materials, such as rubbers or plastics, which do not readily decompose or biodegrade. The continued production of these synthetic materials in order to support the world's ever increasing population makes it even more important that solutions be developed for disposing of these waste materials. The available space in land fills is limited and recycling measures have had little, if any, significant impact on reducing the amounts of solid wastes that are produced and which continue to accumulate.

One alternative is to incinerate or burn these materials in high temperature furnaces. Care must be taken, however, in order to ensure that complete combustion of the solid wastes occurs before exhaust gases are vented to the atmosphere. Incomplete combustion can result in the formation of poisonous carbon monoxide and other pollutants.

One particular area which would benefit from the combustion of these solid waste and which would supply high enough temperatures to ensure complete combustion is in combination with high temperature rotary kilns, such as rotary lime kilns. Lime kilns typically require high temperatures, above 1400° F., in order to effectively calcine lime. Because of the high temperatures present in these rotary kilns, solid waste and other waste materials have sometimes been added or introduced directly into the lime kiln where they are decomposed or combusted into harmless combustion products, mainly water and carbon dioxide. These products are then safely vented to the atmosphere. One of the problems with this method of decomposing of waste materials is that incombustible matter found within the solid waste remains in the rotary kiln and can contaminate the lime or other materials being processed therein.

Because of the potential contamination of process materials within these rotary kilns, it is often desirable to combust the waste material separately from the rotary kiln or convert the waste materials into a useable fuel free of incombustible matter that can contaminate the materials within the rotary kiln. This can be done by means of completely combusting these materials and using the combustion products as a supplemental heat source which is then introduced into the rotary kiln, or by decomposing the waste materials into combustible gases. The later is often referred to as pyrolysis. Pyrolysis occurs when the solid waste are heated to temperatures wherein components of the waste material are volatized or gasified. The pyrolysis products are then introduced into to the rotary kiln where they are burned. These pyrolysis products usually consist of carbon monoxide and light hydrocarbons.

There have been a variety of furnaces designed for the decomposition or combustion of solid waste, particularly waste tires. There is a need for improvements however. One limitation of these prior art furnaces is their inability to operate continuously while removing undecomposed waste material, such as steel or other metals, from the furnace. Many of the continuously operating furnaces require a fluidized bed formed from a fluid-like refractory material, such as sand. Because the waste material is usually dispersed throughout the fluidized bed, it is necessary to remove the refractory material of the fluidized bed along with the undecomposed material. The undecomposed material is then separated out from the refractory materials before the refractory materials are returned to the furnace.

What is needed is a furnace for decomposing solid waste materials, such as automobile tires, which can be operated continuously and which provides a means for separating and removing noncombustible or undecomposed material from the furnace without interfering with the continuous operation of the furnace and which does not utilize a fluidized bed of refractory material that must be replaced within the furnace as the noncombustible or undecomposed materials are removed.

SUMMARY OF THE INVENTION

A high temperature furnace is provided for thermally decomposing solid combustible fuels into products which are used to provide a source of heat to a selected area. The furnace is provided with a reaction vessel which is defined by an outer wall having an upper portion and a lower portion. The lower portion of the vessel has a central partition which divides the lower portion into compartments. Each compartment is configured to containerize a fuel bed having a selected height wherein solid fuel rests and accumulates as the fuel is being decomposed.

A fuel entry port is located in the upper portion of the vessel for introducing fuel into the interior of the reaction vessel onto the fuel bed of each compartment. The fuel entry port has spaced apart first and second closures which can be alternately opened and closed to maintain closure of the entry port when introducing the fuel into the interior of the reaction vessel. Gaseous ducts located along the outer wall of the reaction vessel and the central partition introduce pressurized gas into the interior of the reaction vessel so that at least partial combustion takes place to produce the products used as a source of heat to the selected area. The gaseous ducts are preferably air ducts which are connected to a pressurized air supply means for supplying pressurized air. Communicating with the upper portion of the reaction vessel is an exhaust duct for venting off the products from the reaction vessel to the selected area.

A rotatably driven feeder extends substantially across a bottom opening of each compartment so that the feeder acts as a bottom support for supporting the fuel bed of each compartment. The feeder causes generally undecomposed material from the bottom of each fuel bed to pass out of the reaction vessel through the bottom opening as the feeder is rotated. A drive means is also provided for driving the feeder. Positioned below or adjacent to the reaction vessel is a conveyor which receives the undecomposed material that is passed through the bottom opening of each compartment to the feeder and which conveys this material away from the reaction vessel.

BRIEF DESCRIPTION OF THE DRAWINGS

FIG. 4 is a top plan view of a schematic of the furnace of FIGS. 1–3 used in conjunction with a rotary lime kiln in accordance with the invention.

FIG. 5 is a simplified elevational view of the furnace and rotary lime kiln of FIG. 4.

DESCRIPTION OF THE PREFERRED EMBODIMENT

Figure 1:
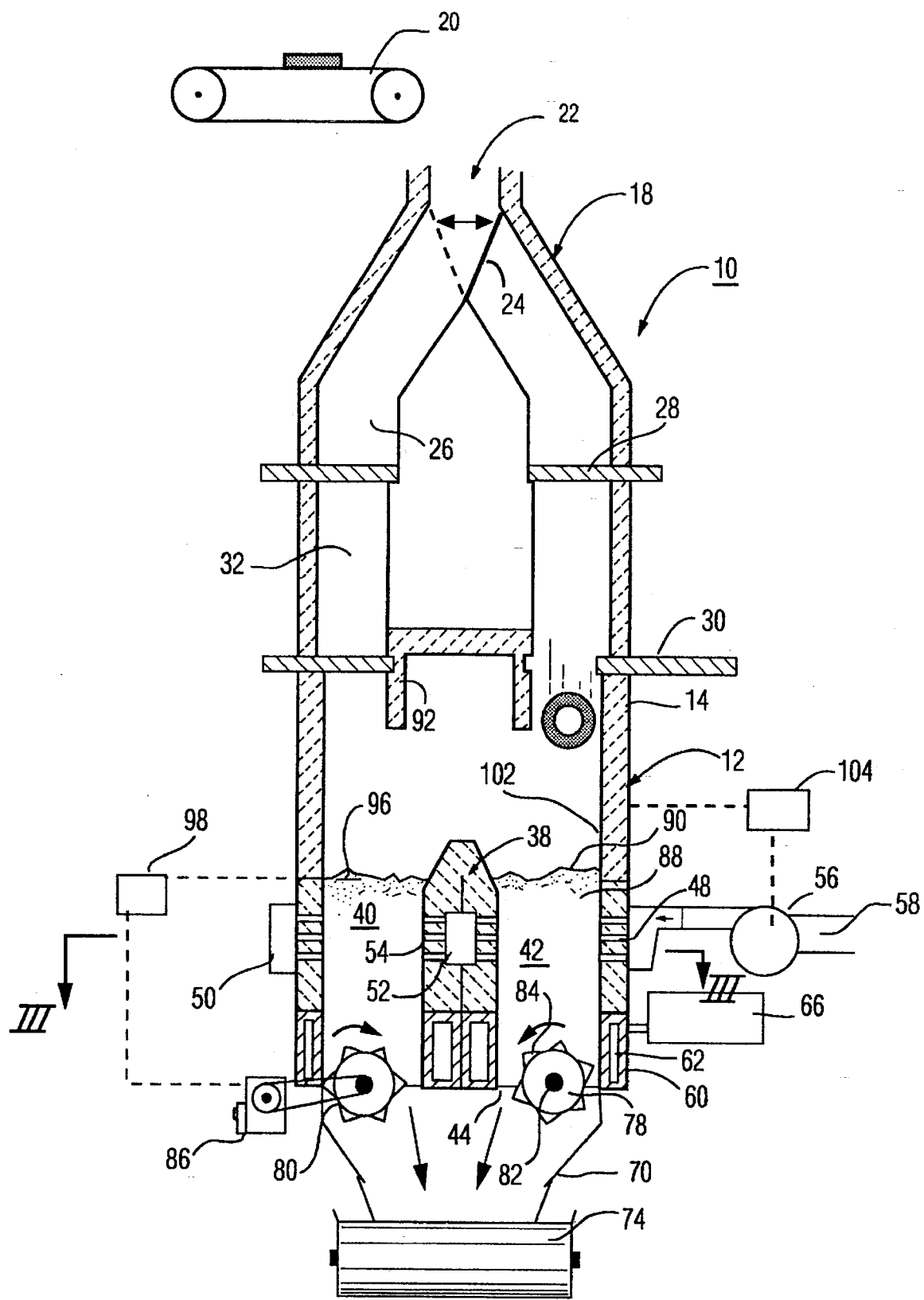
FIG. 1 is a front partial cross-sectional view of a solid waste fuel furnace constructed in accordance with the invention.

Referring to the figures, FIG. 1 shows a furnace 10 for use in thermally decomposing solid combustible waste materials. The term "thermally decomposing" is used herein to encompass both the complete combustion of the solid waste materials and the conversion of the solid waste materials into products of pyrolysis. The furnace 10 is designed for the combustion of whole rubber automobile tires, however, it is within the scope of the invention that other combustible solid wastes could also be used. The solid wastes may be any solid combustible material such as rubber, plastic, paper, etc . . . .

Figure 3:
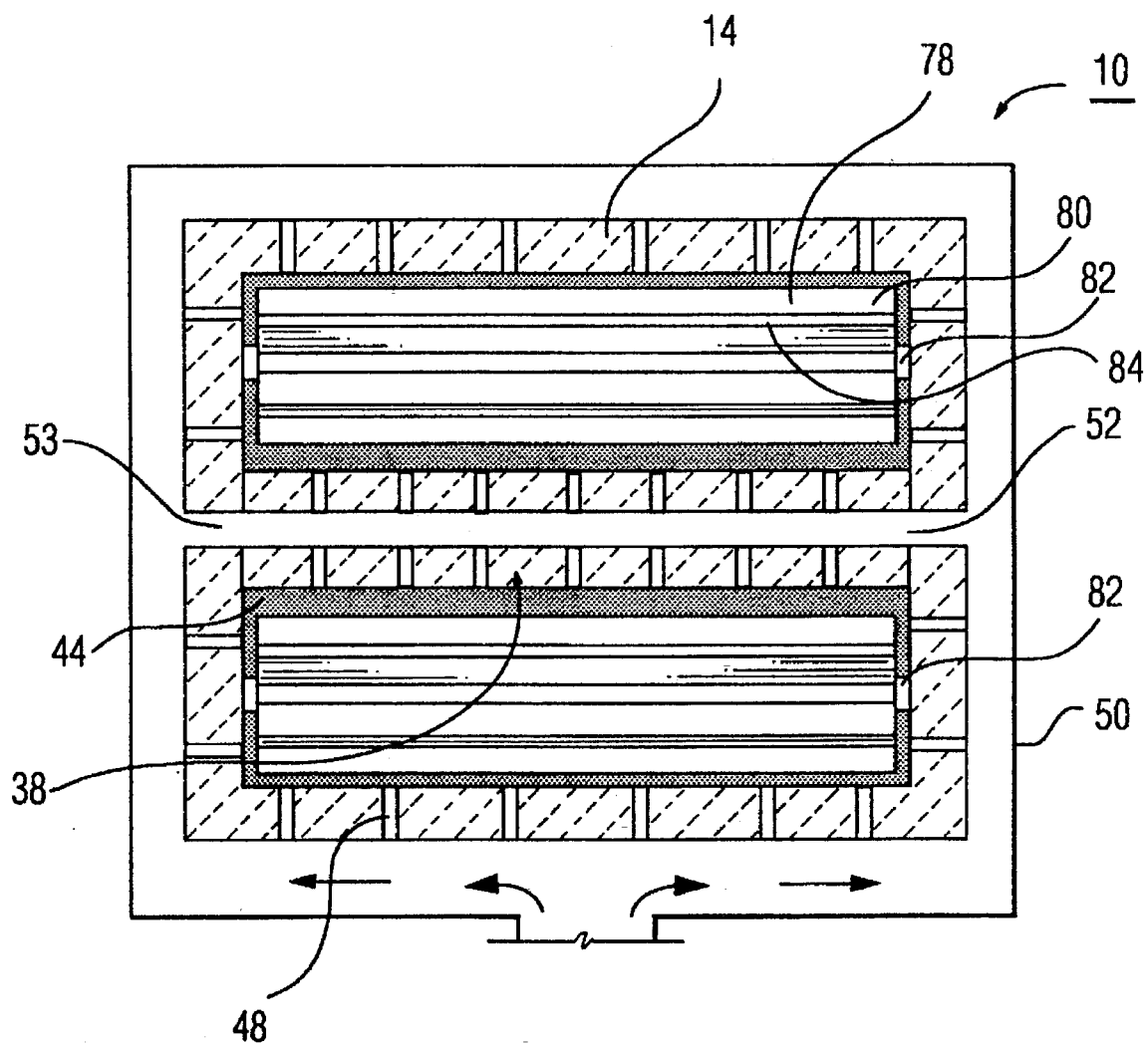
FIG. 3 is a cross-sectional view taken along the lines III—III of FIG. 1.

The furnace 10 has a combustion or pyrolysis chamber 12 defined by an outer wall 14. The chamber 12 has a generally rectangular cross-sectional configuration, as shown in FIG. 3. Located above the combustion chamber 12 is a fuel introduction stage or station 18 of the furnace 10 where fuel is introduced into the interior of the chamber 12. A conveyor belt 20 feeds solid waste fuel to the fuel station 18 of the furnace 10 through a port 22 located at the extreme upper end of the station 18. The fuel introduction portion 18 of the furnace 10 should be formed from a suitable material, such as brick, that is not susceptible to damage from heat given off by the furnace 10.

As shown in FIG. 1, a flap gate 24 is pivotally mounted within the interior of the fuel station 18 for selectively directing the waste fuel from the conveyor belt 20 which is received through port 22 to one of two fuel conduits 26. Each conduit 26 is similarly constructed and defines a passage which opens into the upper portion of the combustion chamber 12. Each of the fuel passages 26 is provided with upper and lower slide gates 28, 30. The upper and lower slide gates 28, 30 are spaced apart a selected vertical distance to define an enclosed space or air lock 32 sized to receive and hold at least one whole automobile tire. The slide gates 28, 30 of each conduit 26 can be alternately opened and closed to maintain closure of the fuel passages 26 when introducing fuel to the interior of the combustion chamber 12.

Figure 2:
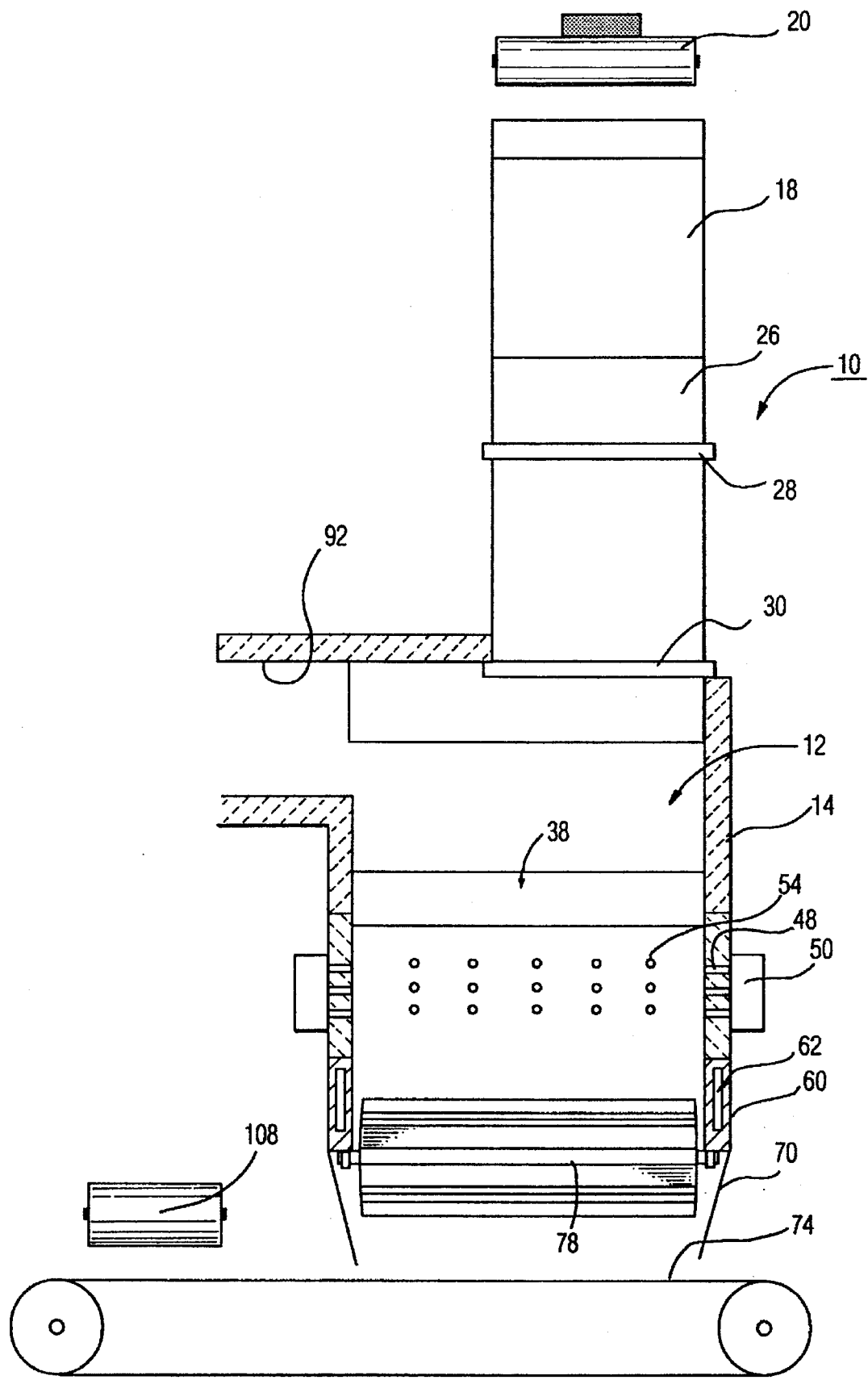
FIG. 2 is a side partial cross-sectional view of the furnace of FIG. 1.

The lower portion of the combustion chamber 12 has a vertical, central partition or divider wall 38 which extends between front and rear walls of the chamber 12, as can best be seen in FIGS. 2 and 3. The partition 38 divides the lower portion of the combustion chamber 12 into lower compartments 40, 42. Although there is only one partition shown, it should be apparent to those skilled in the art that a number of partitions could be utilized so that a number of compartments are formed. Each of the compartments 40, 42 has an opening 44 located at the extreme lower end. The compartments 40, 42 are aligned directly below the openings of the fuel passages 26 which empty into the interior of the combustion chamber 12 so that fuel from each passage 26 falls to one of the compartments 40, 42.

As shown in FIGS. 1–3, a plurality of air ducts 48 are formed in the outer wall 14 of the combustion chamber 12 of the furnace 10. The air ducts 48 are spaced apart at intervals around the entire periphery of the combustion chamber 12. The air ducts 48 are also vertically spaced apart so that the ducts 48 open into the interior of the compartments 40, 42 at different levels along the interior surface of the outer wall 14. An air manifold 50 surrounds the outer wall 14 enclosing the exterior openings of the air ducts 48 formed in the outer wall 14. Pressurized air is thus supplied from manifold 50 and is passed through the ducts 48 to the interior of each of the compartments 40, 42.

As seen in FIGS. 1 and 3, the central partition 38 forms a plenum with an air cavity 52. The air cavity 52 communicates with the air manifold 50, or other air supply, by means of air passageways 53 formed in the outer wall 14. Air ducts 54 located in the central partition 38 extend from the air cavity 52 to either side of the central partition 38 into the compartments 40, 42. The air ducts 54 of the partition 38 are spaced at various intervals along the entire length of the partition 38 and at different vertical levels in a similar configuration to the air ducts 48 formed in the outer wall 14.

A high temperature blower or fan 56 provides pressurized air to the air manifold 50 surrounding the outer wall 14. The blower 56 has an intake 58 for receiving heated air from a heated air source. A cooling jacket 60 surrounds the lower portion of the reaction vessel 12 adjacent to the bottom openings 44 of each compartment 40, 42. The cooling jacket 60 is formed from high temperature stainless steel, such as 316 stainless steel, and is provided with a fluid passage or passages 62 for conducting a cooling fluid, such as water. The cooling jacket 60 surrounds the lower end portion of each of the compartments 40, 42. As seen in FIG. 1, the cooling jacket 60 forms the lower portion of the central partition or divider 38, so that the cooling fluid is conducted around the entire lower periphery of each of the compartments 40, 42. The cooling fluid circulated through the cooling jacket 60 is cooled by means of an exteriorly located heat exchanger 66 where heat is removed from the cooling fluid so that it can be recirculated through the jacket 60.

A discharge chute 70 is located below the bottom openings 44 of the combustion chamber 12. The discharge chute 70 has inwardly sloping sidewalls which direct material from the compartments 40, 42 to a continuous apron-type conveyor 74.

Mounted to the furnace 10 and located within the bottom opening 44 of each compartment 40, 42 is a rotary feeder 78. Each rotary feeder 78 comprises a cylinder 80 which is rotatably mounted about a central longitudinal axle 82. Longitudinal fins, blades or other projections 84 are circumferentially spaced apart about the exterior and along the length of the cylinder 80. Each of the rotary feeders 78 is coupled to a variable speed driver 86 for rotating the rotary feeder 78. The rotary feeders 78 extend across the lower ends of the compartments 40, 42 so that the openings 44 are effectively closed or covered to prevent material within the compartments 40, 42 from freely passing through the openings 44. Approximately 85% closure of the bottom openings 44 by the rotary feeders 78 has been found to be adequate. In this way, the rotary feeders 78 act as bottom supports for supporting a bed 88 of solid waste fuel material which accumulates within each of the compartments 40, 42. As can be seen in FIG. 1, the upper surface 90 of the fuel beds 88 of each compartment 40, 42 is located slightly below the upper end of the central partition 38.

With reference to the fuel bed 88, it can be seen from FIG. 1 that the air ducts 48, 54 open into the interior of the combustion chamber 12 at a position below the upper surface 90. Due to the high temperatures encountered in these areas, that portion of the partition 38 and the outer wall 14 where the air ducts 48, 54 are located are preferably formed from a cast, high temperature refractory material or high temperature stainless steel. In most cases cast refractory materials are suitable and may be preferred due to their lower cost. When the furnace is used for decomposing waste materials having large quantities of iron, such as found in the steel belting of tires, a high alumina refractory material is preferred. A high alumina refractory material having an alumina content of approximately 90% has been found to be suitable for use in decomposing automobile tires. While high silica refractory materials may be suitable in some instances, silica tends to complex with iron which results in the deterioration of the cast material. Above the surface 90 of the fuel bed 88, where temperatures are slightly lower, the outer wall 14 of the combustion chamber 12 may be formed from a less costly material, such as brick.

An exhaust duct 92 (FIG. 2) communicates with the upper portion of the combustion chamber 12 for exhausting combustion or pyrolysis products from within the combustion chamber 12 to a selected area. The exhaust duct 92 is formed from suitable refractory materials so that it is not affected by high temperature exhaust gases and may be insulated where the temperature of the exhaust gases are to remain elevated.

A level sensor 96 is used to determine the level 90 of the fuel bed 88 within each compartment 40, 42. The level sensor 96 is coupled to a driver controller 98 of the variable speed driver 86 for adjusting the rate of rotation of the rotary feeder 78. An oxygen sensor 102 is also located within the interior of the upper portion of the combustion chamber 12 above the upper surface 90 of the fuel bed 88 and is coupled to a blower control 104. The blower control 104 is connected to the blower 56 for controlling the rate that air is introduced into the fuel bed 88 of each compartment 40, 42. In this way the amount of oxygen supplied to the combustion chamber 12 can be varied to ensure the desired thermal decomposition of the solid waste fuel.

Referring to FIG. 2, a magnetic belt 108 is positioned above the apron conveyor 74 to draw off iron material. Undecomposed material on the conveyor 74 which is not removed by the magnetic belt 108 is discharged from the conveyor 74 to a discharge hopper 110, as can be seen in FIGS. 4 and 5.

FIGS. 4 and 5 show the furnace 10 used in combination with a rotary lime kiln 114 to provide a supplemental heat source. The rotary lime kiln 114 is of conventional design having a kiln hood 116. A lime cooler 118 is provided at the downstream end of the kiln 114 for cooling calcined lime to a temperature of approximate 300° F. before it is discharged from the kiln 114. The cooler 118 utilizes ambient air as the cooling medium. Exhaust air from the lime cooler 118 typically has an elevated temperature of about 1000° F. As shown in FIG. 5, the intake 58 of the blower 56 of the furnace 10 is coupled to the lime cooler 118 so that this high temperature exhaust air can be supplied to the blower 56 and introduced into the interior of the combustion chamber 12. The exhaust duct 92 of the furnace 10 communicates with the downstream end of the rotary lime kiln 114 so that decomposition products from the furnace 10 are introduced into the kiln 114.

The operation of the furnace 10 in combination with the rotary lime kiln 114 is as follows. It should be noted that the furnace 10 may have many other applications and should not necessarily be limited to use with a rotary kiln. Initially, whole rubber automobile tires are carried to the furnace 10 from a suitable source by means of the conveyor belt 20. From the conveyor belt 20 the tires are introduced into the furnace through the port 22 of the fuel introduction station 18. By utilizing the flap gate 24, the tires can be selectively introduced into either of the two passages 26.

Before combustion is begun, the upper and lower slide gates 28, 30 may be left open until the compartments 40, 42 of the combustion chamber 12 are filled to a preselected height. The slide gates 28, 30 are then closed. The rotary feeder 78 located at the lower portion of the compartments 40, 42 closing off the bottom openings 44 prevents the accumulated tires from passing through the bottom openings 44 to the conveyor 74. Combustion is then initiated while heated air exhausted from the lime cooler 118 of the rotary kiln 114 is introduced into the fuel bed 88 of the compartments 40, 42 by means of the blower 56. It should be noted that depending upon whether the furnace 10 is used for either complete combustion of the solid waste fuel or for pyrolysis, the amount of air introduced will vary.

By analyzing the amount of oxygen within the combustion chamber 12 by means of the oxygen sensor 102, the volume of air introduced by the blower 56 is adjusted so that enough oxygen is supplied for either complete combustion or for pyrolysis. As shown in FIGS. 1-3, the air is introduced from the air ducts 48, 54 directly into the fuel bed 88 below the fuel bed level 90. This provides more efficient combustion of the fuel of the fuel beds. During pyrolysis this is especially important as air introduced above the fuel bed level 90 would likely result in combustion of the pyrolysis gases.

Where the exhaust products of the furnace 10 are completely combusted and used to provide a direct source of heat to the rotary kiln 114, temperatures between about 1800°–2200° F. are typically required. Lower temperatures are produced during pyrolysis, ranging between about 800°–1500° F. During pyrolysis, the amount of air introduced into the combustion chamber 12 should be just enough to drive combustion of the waste tires so that the waste material is decomposed into volatile pyrolysis products. Tires or waste materials are added as needed during the operation of the furnace 10 at a rate whereby the amount of the decomposition products can be reduced or increased to an appropriate level.

Additional waste tires may be introduced into the combustion chamber 12 from the fuel introduction station 18 of the furnace 10 as necessary. This is accomplished by opening the upper and lower slide gates 28, 30 alternately so that the fuel passages 26 remain sealed at all times. This ensures that no gases are vented from the combustion chamber 12 through the fuel passages 26. When the tires are introduced into either of the fuel passages 26 through the port 22, the upper slide gate 28 is opened to allow the tire or tires to fall to the upper surface of the lower slide gate 30. The upper slide gate 28 is then closed to seal the fuel passage 26, and the lower slide gate 30 is opened so that the waste tires fall to one of the compartments 40, 42 below. Thus, complete sealing of the fuel passages 26 can be maintained during the entire period that the furnace 10 is in operation.

As combustion or pyrolysis continues, unburnt or undecomposed materials, such as the steel belting from the waste tires, will accumulate within the compartments 40, 42. As new fuel is introduced into the furnace 10, these materials eventually settle to the bottom of the compartments 40, 42. The materials at the bottom of the compartments 40, 42 should be cooled to a temperature between 120°–500° F. before being discharged. This is accomplished by circulating water or other coolant through the cooling jacket 60.

To ensure that the amount of material within each compartment 40, 42 remains at a generally constant level, the level sensor 96 monitors the height of the fuel bed 88 and causes the variable speed driver 86 to rotate the rotary feeders 78 at an appropriate rate. The actual rate of rotation of the rotary feeders 78 is usually fairly slow, being about one revolution per minute or less. The rotation of the rotary feeders 78 causes the blades or projections 84 to force the undecomposed material out of the compartments 40, 42 through the openings 44 to the chute 70.

The material which passes from the furnace 10 through the chute 70 falls to the conveyor 74 where it is conveyed away from the furnace 10 and past the magnetic belt 108. Iron material, such as the steel belting of the waste tires, is collected by the magnetic belt 108. Other undecomposed material left on the conveyor 74 is discharged into the hopper 110. If desired, charred or unburnt material may be collected and recycled by introducing it into the furnace 10 once again.

The products of combustion or pyrolysis which are formed and collect within the upper portion of the chamber 12 are discharged from the furnace 10 through the exhaust duct 92. These products are then introduced into the downstream end of the rotary lime kiln 114. Temperatures within the lime kiln will typically range from approximate 1000°–1400° F. at the upstream end and approximately 1900°–2500° F. at the downstream end. If the furnace is used for pyrolysis of the solid waste fuel, the combustible gases from the pyrolysis serve as a source of fuel which are combusted within the rotary lime kiln 114 to supply heat. If the furnace 10 is used for the complete combustion of the solid waste fuel as a means for providing a direct source of heat, the temperatures exhausted through the exhaust duct 92 should be at comparable temperatures to those at the point of the lime kiln 114 where they are introduced.

The furnace and method for thermally decomposing solid waste tires have several advantages over the prior art. The central partition of the furnace acts as an air plenum and compartmentalizes the fuel within the combustion chamber. This allows the air ducts to be spaced around the entire periphery of the compartments so that air is more uniformly and effectively distributed throughout the fuel beds. Thus the fuel beds of the furnace can be formed solely of the solid waste fuel without the need for other materials, such as the refractory materials of conventional furnaces utilizing a fluidized bed.

Steel belting and other uncombusted material are easily removed from the furnace in a continuous operation without requiring shut down. The materials are merely discharged through the bottom openings of the compartments by means of the rotary feeders. Removal of this uncombusted material makes it possible to utilize the furnace exhaust gases, either as a supplemental fuel source or as a direct source of heat, in rotary lime kilns without contaminating the materials processed therein. The furnace can also utilize the exhausted cooling air from the lime cooler of the rotary kiln as a high temperature air supply.

Although the invention has been shown in only one of its forms, it should be apparent to those skilled in the art that it is not so limited but is susceptible to various changes without departing from the scope of the invention.

We claim:

1. A high temperature furnace for thermally decomposing solid combustible fuel into products used to provide a source of heat to a selected area, the furnace comprising in combination:

a reaction vessel defined by an outer wall, the reaction vessel having an upper portion and a lower portion, the lower portion of the vessel having a central partition which divides the lower portion into at least two compartments, each of said compartments being configured to containerize a fuel bed having a selected height, wherein the solid fuel being introduced into the reaction vessel within at least a selected compartment rests and accumulates as the fuel is being decomposed, each compartment also having a bottom opening;

a fuel entry port located in the upper portion of the vessel for introducing solid combustible fuel into the interior of the reaction vessel onto the fuel bed of each compartment, the fuel entry port having spaced apart first and second closures which can be alternately opened and closed to maintain closure of the entry port when introducing the fuel into the interior of the reaction vessel;

gaseous ducts located along the outer wall of the reaction vessel and the central partition for introducing pressurized gas into the interior of the reaction vessel so that at least partial combustion takes place within the interior of the reaction vessel to produce the products used to provide a source of heat;

a pressurized gas supply means connected to the gaseous ducts for supplying the pressurized gas;

an exhaust duct which communicates with the upper portion of the reaction vessel for venting off products from the reaction vessel to the selected area;

a rotatably driven feeder which extends substantially across the bottom opening of each compartment so that the feeder acts as a bottom support for supporting the fuel bed of each compartment, the feeder causing generally undecomposed material from the bottom of each fuel bed to pass out of the reaction vessel through the bottom opening of each compartment as the feeder is rotated;

drive means for driving the feeder;

a conveyor positioned adjacent to the reaction vessel for receiving the undecomposed material which is passed through the bottom opening of the reaction vessel and from the feeder and for conveying the undecomposed material away from the reaction vessel;

wherein the drive means is a variable speed driver coupled to the feeder so that the feeder can be rotated at different rates; and, further comprising:

control means for controlling the variable speed driver so that the amount of undecomposed material removed from the reaction vessel is varied in response to the height of the fuel bed being other than the selected height.

2. A high temperature furnace for thermally decomposing solid combustible fuel into products used to provide a source of heat to a selected area, the furnace comprising in combination:

a reaction vessel defined by an outer wall, the reaction vessel having an upper portion and a lower portion, the lower portion of the vessel having a central partition which divides the lower portion into at least two compartments, each of said compartments being configured to containerize a fuel bed having a selected height, wherein the solid fuel being introduced into the reaction vessel within at least a selected compartment rests and accumulates as the fuel is being decomposed, each compartment also having a bottom opening;

a fuel entry port located in the upper portion of the vessel for introducing solid combustible fuel into the interior of the reaction vessel onto the fuel bed of each compartment, the fuel entry port having spaced apart first and second closures which can be alternately opened and closed to maintain closure of the entry port when introducing the fuel into the interior of the reaction vessel;

gaseous ducts located along the outer wall of the reaction vessel and the central partition for introducing pressurized gas into the interior of the reaction vessel so that at least partial combustion takes place within the interior of the reaction vessel to produce the products used to provide a source of heat;

a pressurized gas supply means connected to the gaseous ducts for supplying the pressurized gas;

an exhaust duct which communicates with the upper portion of the reaction vessel for venting off products from the reaction vessel to the selected area;

a rotatably driven feeder which extends substantially across the bottom opening of each compartment so that the feeder acts as a bottom support for supporting the fuel bed of each compartment, the feeder causing generally undecomposed material from the bottom of each fuel bed to pass out of the reaction vessel through the bottom opening of each compartment as the feeder is rotated;

drive means for driving the feeder;

a conveyor positioned adjacent to the reaction vessel for receiving the undecomposed material which is passed through the bottom opening of the reaction vessel and from the feeder and for conveying the undecomposed material away from the reaction vessel; and wherein there are two compartments and two fuel entry ports, each fuel port being located at a position above one of the two compartments for directing solid fuel to said one of the two compartments.

3. A high temperature furnace for thermally decomposing solid combustible fuel into products used to provide a source of heat to a selected area, the furnace comprising in combination:

a reaction vessel defined by an outer wall, the reaction vessel having an upper portion and a lower portion, the lower portion of the vessel having a central partition which divides the lower portion into at least two compartments, each of said compartments being configured to containerize a fuel bed having a selected height, wherein the solid fuel being introduced into the reaction vessel within at least a selected compartment rests and accumulates as the fuel is being decomposed, each compartment also having a bottom opening;

a fuel entry port located in the upper portion of the vessel for introducing solid combustible fuel into the interior of the reaction vessel onto the fuel bed of each compartment, the fuel entry port having spaced apart first and second closures which can be alternately opened and closed to maintain closure of the entry port when introducing the fuel into the interior of the reaction vessel;

gaseous ducts located along the outer wall of the reaction vessel and the central partition for introducing pressurized gas into the interior of the reaction vessel so that at least partial combustion takes place within the interior of the reaction vessel to produce the products used to provide a source of heat;

a pressurized gas supply means connected to the gaseous ducts for supplying the pressurized gas;

an exhaust duct which communicates with the upper portion of the reaction vessel for venting off products from the reaction vessel to the selected area;

a rotatably driven feeder which extends substantially across the bottom opening of each compartment so that the feeder acts as a bottom support for supporting the fuel bed of each compartment, the feeder causing generally undecomposed material from the bottom of each fuel bed to pass out of the reaction vessel through the bottom opening of each compartment as the feeder is rotated;

drive means for driving the feeder;

a conveyor positioned adjacent to the reaction vessel for receiving the undecomposed material which is passed through the bottom opening of the reaction vessel and from the feeder and for conveying the undecomposed material away from the reaction vessel; and wherein the air ducts open into the interior of the reaction vessel at a position below the selected height of the fuel bed so that the pressurized air is introduced directly into the fuel bed.

4. A high temperature furnace for decomposing whole rubber automobile tires into decomposition products used to provide a supplemental source of heat to a rotary lime kiln, the furnace comprising in combination:

a reaction vessel defined by an outer wall, the reaction vessel having an upper portion and a lower portion, the lower portion of the vessel having a central partition which divides the lower portion into at least two compartments, each of said compartments being configured to containerize a fuel bed having a selected height, wherein the automobile tires being introduced into the reaction vessel rest and accumulate as the tires are being combusted, each compartment also having bottom opening;

a fuel entry port located in the upper portion of the vessel for introducing the tires into the interior of the reaction vessel onto the fuel bed of the compartments, the fuel entry port having spaced apart first and second closures which can be alternately opened and closed to maintain closure of the entry port when introducing the fuel into the interior of the reaction vessel;

air ducts located along the outer wall of the reaction vessel and the central partition for introducing pressurized air into the interior of the reaction vessel so that at least partial combustion takes place within the reaction vessel to produce the products used to provide a source of heat;

a pressurized air supply means connected to the air ducts for supplying the pressurized air;

a refractory lined exhaust duct which communicates with the upper portion of the reaction vessel for venting off the products from the reaction vessel to the rotary lime kiln;

a rotatably driven feeder which extends substantially across the bottom opening of each compartment so that the feeder acts as a bottom support for supporting the fuel bed of each compartment, the feeder causing generally undecomposed material from the bottom of each fuel bed to pass out of the reaction vessel through the bottom opening of each compartment as the feeder is rotated;

a variable speed driver for rotatably driving the feeder at different rates;

a cooling jacket surrounding the lower portion of the reaction vessel adjacent to the bottom opening of each compartment, the cooling jacket having a cooling fluid for transferring heat away from the uncombusted material of the bottom of each fuel bed before the uncombusted material is passed out of the reaction vessel by the feeder;

a conveyor positioned adjacent to the reaction vessel for receiving the generally undecomposed material which is passed through the bottom opening from the feeder and conveying the undecomposed material away from the reaction vessel; and wherein there are two compartments and two fuel entry ports, each fuel entry port being located at a position above one of the two compartments for directing solid fuel to said one of the two compartments.

5. A high temperature furnace for decomposing whole rubber automobile tires into decomposition products used to provide a supplemental source of heat to a rotary lime kiln, the furnace comprising in combination:

a reaction vessel defined by an outer wall, the reaction vessel having an upper portion and a lower portion, the lower portion of the vessel having a central partition which divides the lower portion into at least two compartments, each of said compartments being configured to containerize a fuel bed having a selected height, wherein the automobile tires being introduced into the reaction vessel rest and accumulate as the tires are being combusted, each compartment also having a bottom opening;

a fuel entry port located in the upper portion of the vessel for introducing the tires into the interior of the reaction vessel onto the fuel bed of the compartments, the fuel entry port having spaced apart first and second closures which can be alternately opened and closed to maintain closure of the entry port when introducing the fuel into the interior of the reaction vessel;

air ducts located along the outer wall of the reaction vessel and the central partition for introducing pressurized air into the interior of the reaction vessel so that at least partial combustion takes place within the reaction vessel to produce the products used to provide a source of heat;

a pressurized air supply means connected to the air ducts for supplying the pressurized air;

a refractory lined exhaust duct which communicates with the upper portion of the reaction vessel for venting off the products from the reaction vessel to the rotary lime kiln;

a rotatably driven feeder which extends substantially across the bottom opening of each compartment so that the feeder acts as a bottom support for supporting the fuel bed of each compartment, the feeder causing generally undecomposed material from the bottom of each fuel bed to pass out of the reaction vessel through the bottom opening of each compartment as the feeder is rotated;

a variable speed driver for rotatably driving the feeder at different rates;

a cooling jacket surrounding the lower portion of the reaction vessel adjacent to the bottom opening of each compartment, the cooling jacket having a cooling fluid for transferring heat away from the uncombusted material of the bottom of each fuel bed before the uncombusted material is passed out of the reaction vessel by the feeder;

a conveyor positioned adjacent to the reaction vessel for receiving the generally undecomposed material which is passed through the bottom opening from the feeder and conveying the undecomposed material away from the reaction vessel; and wherein the air ducts open into the interior of the reaction vessel at a position below the selected height so that the pressurized air is introduced directly into the fuel bed.

6. A method for thermally decomposing solid combustible fuel to provide a source of heat to a selected area, the method comprising the steps of:

providing a combustion reaction vessel defined by an outer wall having an upper portion and a lower portion, the lower portion having a central partition which divides the lower portion into compartments, each compartment configured to containerize a fuel bed, each compartment having a bottom opening;

introducing the solid combustible fuel through a fuel entry port of the upper portion into the interior of the reaction vessel so that the fuel rests and accumulates in the compartments of the lower portion of the reaction vessel to form the fuel bed within each compartment to a selected height;

introducing pressurized air from a pressurized air supply through the outer wall and the central partition into each compartment of the reaction vessel so that at least partial combustion takes place within the interior of the reaction vessel to produce the products used to provide a source of heat;

exhausting the products from the interior of the reaction vessel through an exhaust duct to the selected area;

providing a rotatably driven feeder extending substantially across the bottom opening of each compartment so that the feeder supports the fuel bed of each compartment;

rotating the feeder so that generally undecomposed material from the bottom of each fuel bed is passed out of the reaction vessel through the bottom opening of each compartment;

conveying the generally undecomposed material away from the reaction vessel;

monitoring the height of the fuel bed; and adjusting the rate of removal of the undecomposed material by the feeder in response to the height of the fuel bed being other than at the selected height.

7. A method for thermally decomposing solid combustible fuel to provide a source of heat to a selected area, the method comprising the steps of:

providing a combustion reaction vessel defined by an outer wall having an upper portion and a lower portion, the lower portion having a central partition which divides the lower portion into compartments, each compartment configured to containerize a fuel bed, each compartment having a bottom opening;

introducing the solid combustible fuel through a fuel entry port of the upper portion into the interior of the reaction vessel so that the fuel rests and accumulates in the compartments of the lower portion of the reaction vessel to form the fuel bed within each compartment to a selected height;

introducing pressurized air from a pressurized air supply through the outer wall and the central partition into each compartment of the reaction vessel so that at least partial combustion takes place within the interior of the reaction vessel to produce the products used to provide a source of heat;

exhausting the products from the interior of the reaction vessel through an exhaust duct to the selected area;

providing a rotatably driven feeder extending substantially across the bottom opening of each compartment so that the feeder supports the fuel bed of each compartment;

rotating the feeder so that generally undecomposed material from the bottom of each fuel bed is passed out of the reaction vessel through the bottom opening of each compartment;

conveying the generally undecomposed material away from the reaction vessel; and wherein there are two compartments and two fuel entry ports, each fuel entry port being located at a position above one of the two compartments for directing solid fuel to said one of the two compartments.

8. A method for thermally decomposing solid combustible fuel to provide a source of heat to a selected area, the method comprising the steps of:

providing a combustion reaction vessel defined by an outer wall having an upper portion and a lower portion, the lower portion having a central partition which divides the lower portion into compartments, each compartment configured to containerize a fuel bed, each compartment having a bottom opening;

introducing the solid combustible fuel through a fuel entry port of the upper portion into the interior of the reaction vessel so that the fuel rests and accumulates in the compartments of the lower portion of the reaction vessel to form the fuel bed within each compartment to a selected height;

introducing pressurized air from a pressurized air supply through the outer wall and the central partition into each compartment of the reaction vessel so that at least partial combustion takes place within the interior of the reaction vessel to produce the products used to provide a source of heat;

exhausting the products from the interior of the reaction vessel through an exhaust duct to the selected area;

providing a rotatably driven feeder extending substantially across the bottom opening of each compartment so that the feeder supports the fuel bed of each compartment;

rotating the feeder so that generally undecomposed material from the bottom of each fuel bed is passed out of the reaction vessel through the bottom opening of each compartment;

conveying the generally undecomposed material away from the reaction vessel; and wherein the pressurized air is introduced within the interior of the reaction vessel at a position below the selected height directly into the fuel bed.

* * * * *